(12) United States Patent
Hegeman et al.

(10) Patent No.: US 12,692,757 B1
(45) Date of Patent: Jul. 28, 2026

(54) WELL PLUG DEBRIS CAPTURING SYSTEM

(71) Applicant: Bandit Services, LLC, Pittsburgh, PA (US)

(72) Inventors: David F. Hegeman, Stahlstown, PA (US); Jared Paul Alexander, West Newton, PA (US)

(73) Assignee: Bandit Services, LLC, Pittsburgh, PA (US)

( * ) Notice: Subject to any disclaimer, the term of this patent is extended or adjusted under 35 U.S.C. 154(b) by 0 days.

(21) Appl. No.: 19/213,287

(22) Filed: May 20, 2025

(51) Int. Cl.
| | |
|---|---|
| *E21B 21/06* | (2006.01) |
| *B01D 29/52* | (2006.01) |
| *B01D 29/60* | (2006.01) |
| *B01D 35/12* | (2006.01) |
| *B01D 35/157* | (2006.01) |
| *B01D 37/04* | (2006.01) |
| *E21B 29/00* | (2006.01) |

(52) U.S. Cl.
CPC ........... *E21B 21/065* (2013.01); *B01D 29/52* (2013.01); *B01D 29/606* (2013.01); *B01D 35/12* (2013.01); *B01D 35/1573* (2013.01); *B01D 37/046* (2013.01); *E21B 29/00* (2013.01)

(58) Field of Classification Search
CPC ........ E21B 21/065; E21B 29/00; E21B 21/06; E21B 21/063; E21B 21/066; B01D 29/52; B01D 29/606; B01D 35/12; B01D 35/1573; B01D 37/046
See application file for complete search history.

(56) References Cited

U.S. PATENT DOCUMENTS

| | | | | | |
|---|---|---|---|---|---|
| 12,385,366 | B1* | 8/2025 | Greci | ..................... | E21B 47/10 |
| 2020/0130017 | A1* | 4/2020 | Trifol | ..................... | B01D 29/35 |
| 2020/0277841 | A1* | 9/2020 | Olliff | ..................... | E21B 44/02 |
| 2024/0167338 | A1* | 5/2024 | Garcia Soule | ........ | E21B 21/065 |
| 2024/0253062 | A1* | 8/2024 | Olivares Antunez | ..... | B04B 9/10 |
| 2024/0318514 | A1* | 9/2024 | John | ..................... | B01D 29/66 |

* cited by examiner

*Primary Examiner* — Yanick A Akaragwe
(74) *Attorney, Agent, or Firm* — The Webb Law Firm

(57) ABSTRACT

A debris capturing system includes: a plug catcher including: a first plug catcher run having a first end and a second end opposite the first end; a first valve in an open position and positioned on the first end of the first plug catcher run; a second plug catcher run having a first end and a second end opposite the first end; and a second valve in a closed position and positioned on the first end of the second plug catcher run; and a controller; where the controller is configured to cycle the first valve to a closed position, and to cycle the second valve to an open position.

18 Claims, 9 Drawing Sheets

WELL PLUG DEBRIS CAPTURING SYSTEM

BACKGROUND OF THE INVENTION

Field of the Invention

This invention relates generally to drill out systems for the oil and gas industry; and more specifically, for debris capturing systems and methods thereof for drill out systems.

Technical Considerations

In the oil and gas industry, molecules of oil and gas hydrocarbons are typically trapped at a certain depth below Earth's surface, requiring a drill out and completion operation to reach the trapped hydrocarbon formations. The drill out system can be configured to drill a well in the Earth's surface down to a certain depth so that the desired oil or gas formations can be located and released. In the well drilled by the drill out system, one or more plugs of cement or similar material may be positioned in the well at various depths during well completion. These plugs are provided to improve the structural integrity of the well and/or to segment off various depths of the well. These plugs are drilled through during well completion when the operation requires access to the depth below said plug.

During drilling and well completion, a lubricant may be provided to the drill in order to lubricate the drill while it drills the well and/or plugs. While drilling, a slurry is formed from the lubricant with suspended debris from the broken earth and plugs. This slurry formed from the lubricant with suspended debris is incapable of being reused for further drilling operations unless the debris is removed from the lubricant.

As such, there is a current need for an efficient, continuous, and more environmentally-friendly debris capturing system for implementing with an oil and/or gas drill out system capable of removing debris from the slurry to provide a recycled lubricant.

SUMMARY OF THE INVENTION

In one aspect of the present disclosure, a debris capturing system includes a plug catcher configured to receive a slurry of debris suspended in the lubricant and filter the slurry to produce a recycled lubricant, where the plug catcher includes: a first plug catcher run having a first end and a second end opposite the first end; a first valve in an open position and positioned on the first end of the first plug catcher run; a second plug catcher run having a first end and a second end opposite the first end; and a second valve in a closed position and positioned on the first end of the second plug catcher run; and a controller; where the controller is configured to cycle the first valve to a closed position to prevent the slurry from flowing into the first plug catcher run, and to cycle the second valve to an open position to allow the slurry to flow into the second plug catcher run.

The controller may be a hydraulic controller including a hydraulic unit and the first valve and second valve are hydraulic valves, where the hydraulic unit is in hydraulic communication with the first valve and second valve. The first valve and the second valve may be electric valves that are in electrical communication with the controller. The debris of the slurry may include portions of a plug. The controller may include an input component, where the controller is configured to cycle the first valve to a closed position and to cycle the second valve to an open position when an operator provides an input to the input component. The plug catcher may further include: a first pressure sensor on the first end of the first plug catcher run; and a second pressure sensor on the second end of the first plug catcher run; where the controller is configured to cycle the first valve to a closed position and the second valve to an open position when a first differential pressure across the first plug catcher run exceeds a first maximum differential pressure. The first maximum differential pressure may be in the range of from 5 psi to 70 psi. The plug catcher may continuously filter the slurry to produce the recycled lubricant. The debris capturing system may further include a manifold in fluid communication with the plug catcher and configured to receive the recycled lubricant, where the manifold includes a plurality of outlet streams and a plurality of manifold valves positioned on the plurality of outlet streams, where the controller is configured to cycle the plurality of manifold valves independently between an open position and a closed position. The debris capturing system may further include a tank in fluid communication with the plug catcher and configured to receive the recycled lubricant from the plug catcher. A basket may be in fluid communication with the plug catcher and configured to receive flushed debris for inspection from the plug catcher.

In another aspect of the present disclosure, a drill out system includes a drill configured to bore a well, where the drill includes a hollow volume that supplies a lubricant into the well; and the aforementioned debris capturing system in fluid communication with the well.

In another aspect of the present disclosure, a method of removing debris from a drill out system includes the steps of: lubricating a drill with a lubricant; drilling a plug positioned in a well with the drill, where the drilling produces a slurry including debris suspended in the lubricant; transporting the slurry in the well to a plug catcher including: a first plug catcher run having a first end and a second end opposite the first end; a first valve in an open position and positioned on the first end of the first plug catcher run; a second plug catcher run having a first end and a second end opposite the first end; and a second valve in a closed position and positioned on the first end of the second plug catcher run; filtering the slurry in the first plug catcher run to produce a recycled lubricant; activating a controller to cycle the first valve from an open position to a closed position to prevent the slurry from flowing into the first plug catcher run and to cycle a second valve from a closed position to an open position to allow the slurry to flow into the second plug catcher run; and filtering the slurry in the second plug catcher run to produce the recycled lubricant.

The activating step may include providing an input to an input component of the controller to activate the controller. The activating step may include activating the controller to cycle the first valve to the closed position and to cycle the second valve to the open position once a first differential pressure across the first plug catcher run exceeds a first maximum differential pressure, where the first differential pressure is based on a first pressure measurement from a first pressure sensor positioned on the first end of the first plug catcher run and a second pressure measurement from a second pressure sensor positioned on the second end of the first plug catcher run. The first maximum differential pressure may be in the range of from 5 psi to 70 psi. The method may further include, after filtering the slurry in the second plug catcher run, reactivating the controller to cycle the first valve from the closed position to the open position and to cycle the second valve from the open position to the closed position. The method may further include transporting the recycled lubricant from the plug catcher to a tank. The method may further include transporting the recycled lubricant from the plug catcher to a manifold including a plurality of output streams and a plurality of manifold valves. The method may further include: flushing debris present in the first plug catcher run after the first valve is closed to a basket that is in fluid communication with the plug catcher; and inspecting the debris in the basket.

Various non-limiting examples and aspects of the present invention will now be described and set forth in the following numbered clauses:

Clause 1: A debris capturing system, comprising: a plug catcher configured to receive a slurry of debris suspended in the lubricant and filter the slurry to produce a recycled lubricant, wherein the plug catcher comprises: a first plug catcher run having a first end and a second end opposite the first end; a first valve in an open position and positioned on the first end of the first plug catcher run; a second plug catcher run having a first end and a second end opposite the first end; and a second valve in a closed position and positioned on the first end of the second plug catcher run; and a controller; wherein the controller is configured to cycle the first valve to a closed position to prevent the slurry from flowing into the first plug catcher run, and to cycle the second valve to an open position to allow the slurry to flow into the second plug catcher run.

Clause 2: The debris capturing system of clause 1, wherein the controller is a hydraulic controller comprising a hydraulic unit and the first valve and second valve are hydraulic valves, wherein the hydraulic unit is in hydraulic communication with the first valve and second valve.

Clause 3: The debris capturing system of clause 1, wherein the first valve and the second valve are electric valves that are in electrical communication with the controller.

Clause 4: The debris capturing system of any of clauses 1-3, wherein the debris of the slurry comprises portions of a plug.

Clause 5: The debris capturing system of any of clauses 1-4, wherein the controller comprises an input component, wherein the controller is configured to cycle the first valve to a closed position and to cycle the second valve to an open position when an operator provides an input to the input component.

Clause 6: The debris capturing system of any of clauses 1-5, wherein the plug catcher further comprises: a first pressure sensor on the first end of the first plug catcher run; and a second pressure sensor on the second end of the first plug catcher run; wherein the controller is configured to cycle the first valve to a closed position and the second valve to an open position when a first differential pressure across the first plug catcher run exceeds a first maximum differential pressure.

Clause 7: The debris capturing system of clause 6, wherein the first maximum differential pressure is in the range of from 5 psi to 70 psi.

Clause 8: The debris capturing system of any of clauses 1-7, wherein the plug catcher continuously filters the slurry to produce the recycled lubricant.

Clause 9: The debris capturing system of any of clauses 1-8, wherein the debris capturing system further comprises a manifold in fluid communication with the plug catcher and configured to receive the recycled lubricant, wherein the manifold comprises a plurality of outlet streams and a plurality of manifold valves positioned on the plurality of outlet streams, wherein the controller is configured to cycle the plurality of manifold valves independently between an open position and a closed position.

Clause 10: The debris capturing system of any of clauses 1-9, wherein the debris capturing system further comprises a tank in fluid communication with the plug catcher and configured to receive the recycled lubricant from the plug catcher.

Clause 11: The debris capturing system of any of clauses 1-10, further comprising a basket in fluid communication with the plug catcher and configured to receive flushed debris for inspection from the plug catcher.

Clause 12: A drill out system, comprising: a drill configured to bore a well, wherein the drill comprises a hollow volume that supplies a lubricant into the well; and the debris capturing system of any of clauses 1-11 in fluid communication with the well.

Clause 13: A method of removing debris from a drill out system, comprising the steps of: lubricating a drill with a lubricant; drilling a plug positioned in a well with the drill, wherein the drilling produces a slurry comprising debris suspended in the lubricant; transporting the slurry in the well to a plug catcher comprising: a first plug catcher run having a first end and a second end opposite the first end; a first valve in an open position and positioned on the first end of the first plug catcher run; a second plug catcher run having a first end and a second end opposite the first end; and a second valve in a closed position and positioned on the first end of the second plug catcher run; filtering the slurry in the first plug catcher run to produce a recycled lubricant; activating a controller to cycle the first valve from an open position to a closed position to prevent the slurry from flowing into the first plug catcher run and to cycle a second valve from a closed position to an open position to allow the slurry to flow into the second plug catcher run; and filtering the slurry in the second plug catcher run to produce the recycled lubricant.

Clause 14: The method of clause 13, wherein the activating step comprises providing an input to an input component of the controller to activate the controller.

Clause 15: The method of clause 13 or 14, wherein the activating step comprises activating the controller to cycle the first valve to the closed position and to cycle the second valve to the open position once a first differential pressure across the first plug catcher run exceeds a first maximum differential pressure, wherein the first differential pressure is based on a first pressure measurement from a first pressure sensor positioned on the first end of the first plug catcher run and a second pressure measurement from a second pressure sensor positioned on the second end of the first plug catcher run.

Clause 16: The method of clause 15, wherein the first maximum differential pressure is in the range of from 5 psi to 70 psi.

Clause 17: The method of any of clauses 13-16, further comprising, after filtering the slurry in the second plug catcher run, reactivating the controller to cycle the first valve from the closed position to the open position and to cycle the second valve from the open position to the closed position.

Clause 18: The method of any of clauses 13-17, further comprising transporting the recycled lubricant from the plug catcher to a tank.

Clause 19: The method of any of clauses 13-18, further comprising transporting the recycled lubricant from the plug catcher to a manifold comprising a plurality of output streams and a plurality of manifold valves.

Clause 20: The method of any of clauses 13-19, further comprising: flushing debris present in the first plug catcher run after the first valve is closed to a basket that is in fluid communication with the plug catcher; and inspecting the debris in the basket.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
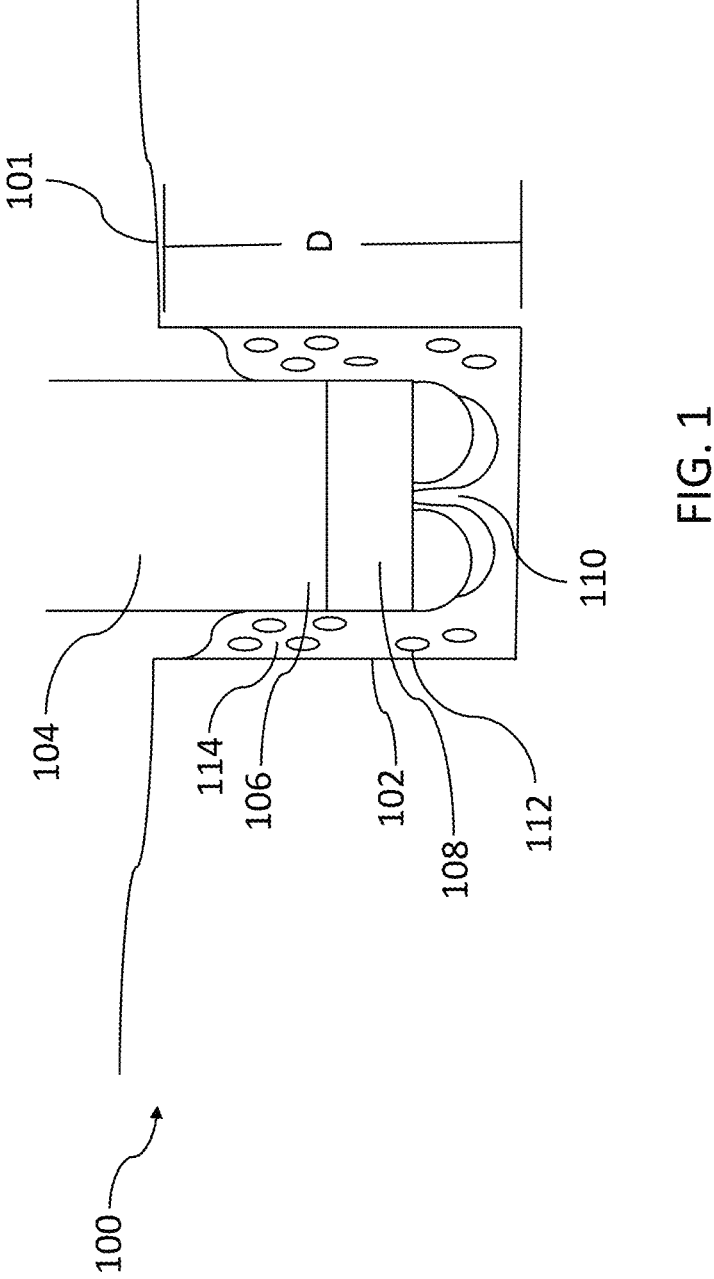
FIG. 1 is a partial schematic view of a drill out system according to one aspect of the present disclosure.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Referring to FIGS. 1-4, a drill out system 100 for extracting oil and/or gas is provided. The drill out system 100 may include an oil and/or gas well 102. As used herein, a "drill out system" refers to a system used for the drilling and/or the completion of an oil and/or gas well 102. The well 102 may be drilled down below the surface to a predetermined depth D. The "predetermined depth" may be a depth D of the well 102 that allows the well 102 to be used to access and extract oil and/or gas formations present in the ground 101 at some point along the depth D of the well 102. The predetermined depth D may be deeper than a depth of oil and/or gas formations present in the ground 101. Such a drill out system 100 may be configured to operate 24 hours a day at seven days a week.

Figure 3:
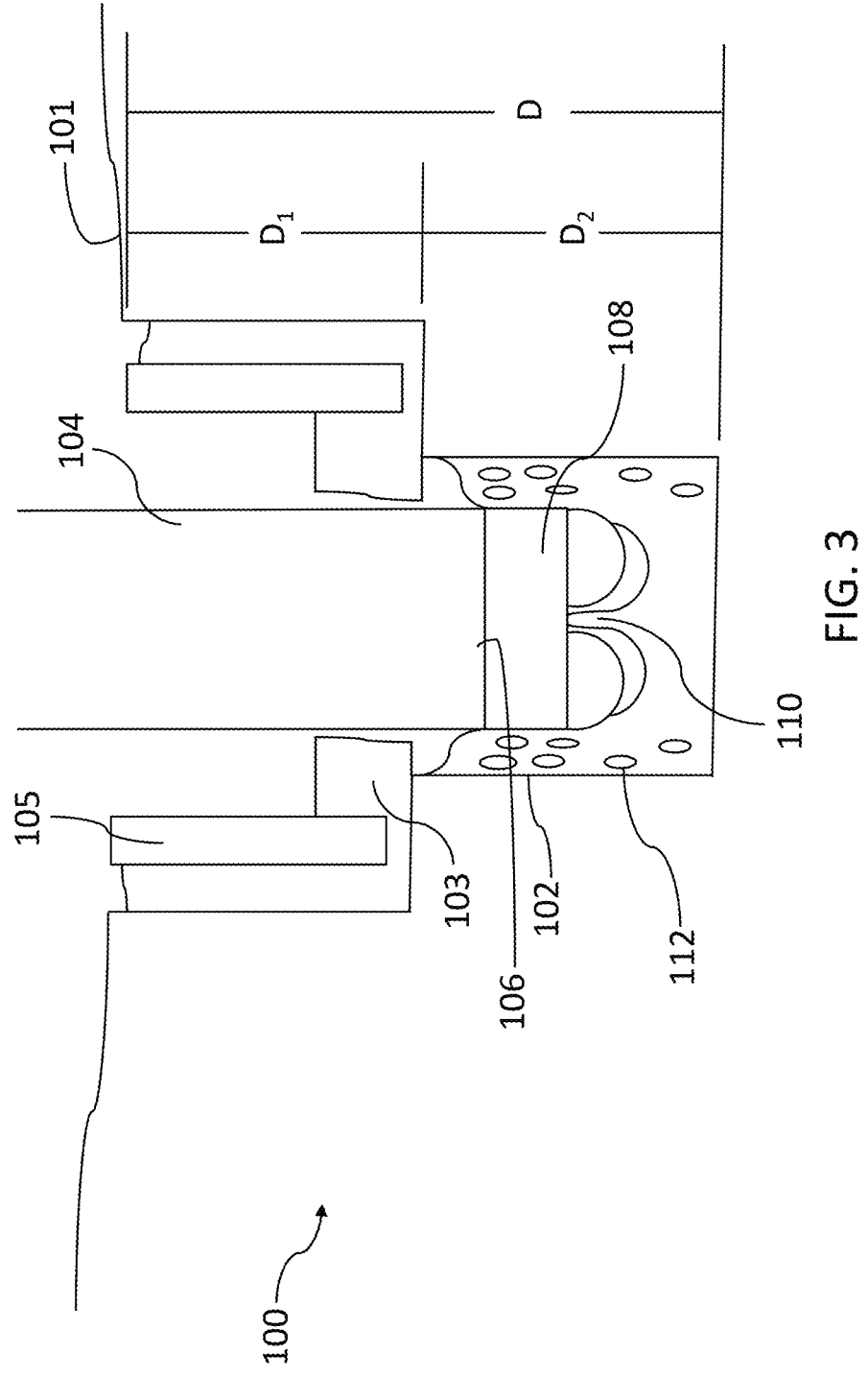
FIG. 3 is a partial schematic view of a drill out system according to another aspect of the present disclosure.

As shown in FIG. 3, a casing 105 may be provided to cover the interior surface of the well 102 to aid in protecting the surrounding ground 101 from contamination. The casing 105 may be a steel or similar material pipe. Cement may then be pumped into the bottom of the well 102 and casing 105, such that the cement pushes up between the casing 105 and the interior surface of the well 102. The cement therefore bonds the casing 105 to the interior surface 102 and also creates a plug 103 at the bottom of the well 102 and casing 105. This process may be repeated to provide a plurality of casings 105 layered on the interior surface of the well 102 for added protection. For example, a plurality of casings 105 may be provided in the well 102 at a depth of ground water to protect against contamination of the ground water.

Figure 2:
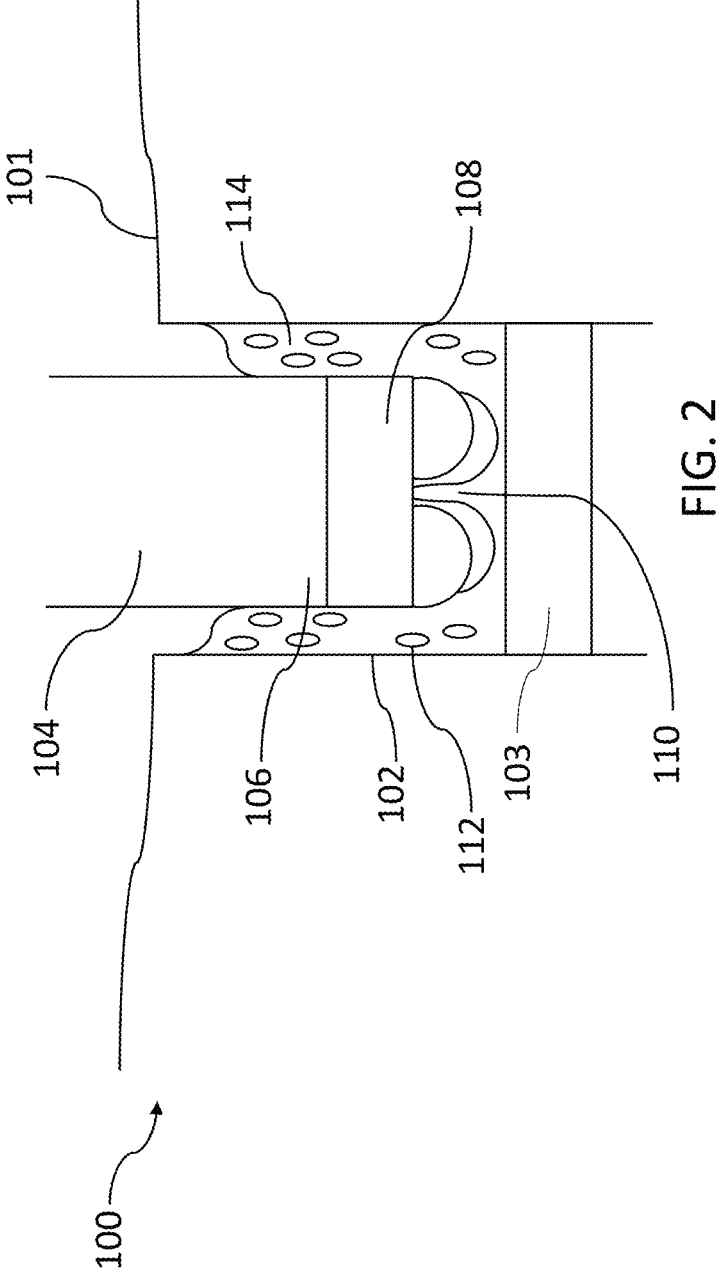
FIG. 2 is a partial schematic view of a drill out system according to another aspect of the present disclosure.

The well 102 may include a plug 103, such as a plurality of plugs 103. In some non-limiting embodiments, a plug 103 may be formed when cement is pumped to the bottom of a casing 105 to bond the casing 105 to the interior surface of the well 102, as shown in FIG. 3, thereby creating a cement plug. The plug 103 may comprise various materials, including, but not limited to, cement, fiberglass, plastic, metal, and/or combinations thereof. In some non-limiting embodiments, the plug 103 may be provided independent of any casing 105, as shown in FIG. 2. In some non-limiting embodiments, a plug 103 may be provided in the well 102 to secure the structural integrity of the well 102 and/or to segment off sections of the well 102 until said well segment is desired to be accessed. The plug 103 may be provided at a predetermined depth within the well 102. If the plug 103 comprises a plurality of plugs 103, the plurality of plugs 103 may be spaced apart at random intervals along the depth D of the well 102. The plug may have a thickness in the range of from 16 to 24 inches, as measured from the surface of the plug 103 closest to the opening of the well 102 down to the surface of the plug that faces the bottom of the well 102.

Referring to FIGS. 1-4, the drill out system 100 may include a drill 104. The drill 104 may extend into the well 102 and configured to drill into the ground 101 to increase the depth of the well 102 and to drill into and through the plug(s) 103 to allow access to the well 102 below the plug(s) 103. The length of the drill 104 may be varied such that the drill 104 can reach various depths in the well 102. The drill out system 100 may include a motor, such as a top drive motor or rotary table and kelly drive, that rotates the drill 104. The drill out system 100 may include a derrick positioned over top of the well 102. The derrick may include a lifting string and lifting hook attached to the drill 104 to allow the drill 104 to be raised and/or lowered into the well 102. The drill out system 100 may include a rig pump 188 (see FIG. 4). The rig pump 188 may be configured to pump and supply lubricant 110 and recycled lubricant 128 into the well 102.

The drill 104 may include a distal end 106 that may include a drill bit 108. The drill bit 108 may be configured to cut through and break up the ground 101 and/or plug(s) 103. The drill bit 108 may be any drill bit known in the art capable of drilling a well 102. The drill 104 may include a hollow volume extending the length of the drill 104 and open at the distal end 106 of the drill 104.

Referring to FIG. 3, the drill 104 and drill bit 108 may be configured to drill the well 102 such that the well 102 has a different diameter at different depths. For example, a first drill bit 108 may drill the well 102 to a first depth $D_1$ having a first diameter and a second drill bit 108 may drill the well 102 to a second depth $D_2$ having a second diameter smaller than the first diameter. In such an example, a plurality of casings 105 may be provided having different diameters such that the plurality of casings 105 can cover the interior surface of the well 102 that has different diameters. The diameters of the plurality of casings 105 may be slightly smaller than the first diameter and second diameter of the well 102 such that the plurality of casings 105 may be positioned in the well 102 at the varying depths having different diameters.

For example, as shown in FIG. 3, after the first drill bit 108 drills the well 102 to the first depth $D_1$, a first casing 105 having a diameter that fits into the first diameter of the well 103 may be provided in the well 102 and extending down to the first depth $D_1$ of the well 102. Cement may then be pumped into the well 102 and first casing 105 such that the cement pushes up between the first casing 105 and well 102 at the first depth $D_1$ to bond the first casing 105 to the interior surface of the well 102 at the first depth $D_1$, and also forming a plug 103 at the bottom of the well 102. Then, a second drill bit 108 can then drill through the plug 103 and/or first casing 105 and drill the well 102 to a second depth $D_2$ having a second diameter smaller than the first diameter. A second casing 105 having a diameter that fits into the second diameter of the well 102 may be provided in the well 102 and extending down to the second depth $D_2$, in the same manner as the first casing 105. Cement may then be pumped into the well 102 and second casing 105 such that the cement pushes up between the second casing 105 and well 102 at the second depth $D_2$ to bond the second casing 105 to the interior surface of the well 102 at the second depth $D_2$, and also forming a plug 103 at the bottom of the well 102. This may be repeated for additional casings 105 and/or additional well 102 diameters until the desired depth and desired number of diameters of the well 102 is achieved.

As shown in FIGS. 1-3, a lubricant 110 may be provided into the hollow volume of the drill 104. The lubricant 110 may then work down through the depth of the hollow volume until the lubricant 110 reaches the distal end 106 of the drill 104. The lubricant 110 may then exit the hollow volume at the distal end 106 so that it may fill the well 102 and lubricate the drill bit 108.

As shown in FIGS. 1-3, while the drill 104 is in operation to drill through the ground 101, casing(s) 105, and/or plug(s) 103, the lubricant 110 is present in the well 102 and is configured to lubricate the drill bit 108 of the drill 104. The operation of the drill 104 produces debris 112 from the broken ground rock 101, casing(s) 105, and/or plug(s) 103. The debris 112 may include broken pieces of the ground rock 101, casing(s) 105, and/or of plug(s) 103. In some non-limiting embodiments, the debris 112 may include further components, such was water, brine (salt water), heavy metals, drilling chemicals, naturally occurring radio-active materials (NORM), additives such as friction reducers, and/or the like. This debris 112 may become suspended in the lubricant 110 during operation of the drill 104, thereby producing a slurry 114 of debris 112 suspended in the lubricant 110. As the lubricant 110 is pushed into the well 102 from the hollow volume of the drill 104, the slurry 114 may be displaced upwardly through the well 102 along the outside of the drill 104.

Figure 4:
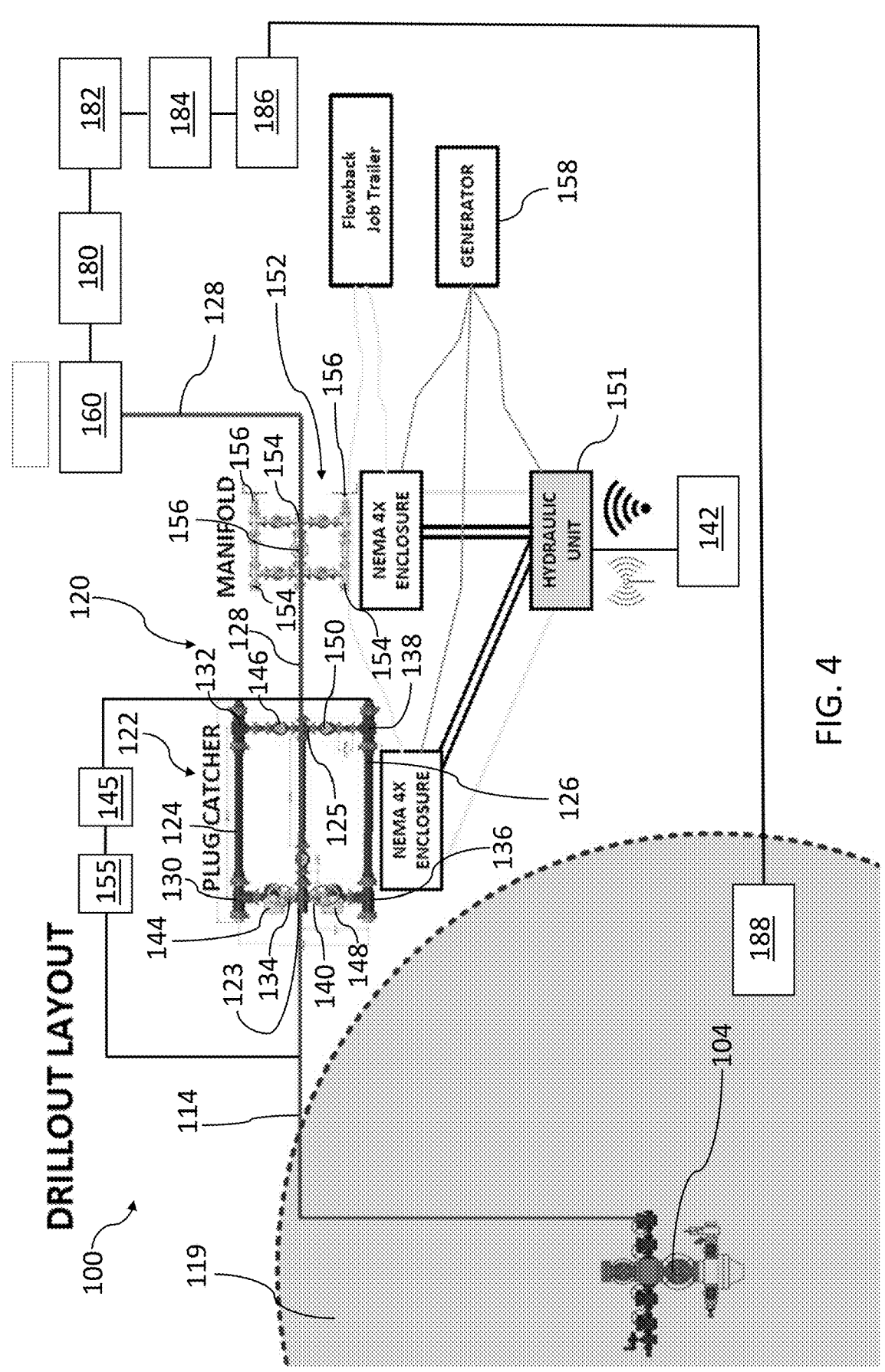
FIG. 4 is a partial schematic view of a drill out system according to another aspect of the present disclosure.

Referring to FIG. 4, the drill out system 100 may include an operation zone 119. The drill out system 100 may further include a debris capturing system 120. The debris capturing system 120 may be located outside of the operation zone 119. The debris capturing system 120 may be in fluid communication with the well 102 via the flowback line of the well 102, as is known in the oil and gas drilling arts, and may be configured to receive the slurry 114 from the well 102 and remove the debris 112 to produce a recycled lubricant 128. The debris capturing system 120 may include a plug catcher 122. The plug catcher 122 may be configured to filter out debris 112 from the plugs 103, casing 105, and/or rock 101 from a slurry 114. The plug catcher 122 may include valves, piping, and screens arranged in a way such that debris 112 will be caught in the screens prior to exiting the plug catcher 122. Without removing the debris 122, the drill out system 100 may become blocked (clogged), which would stop flow. Maintaining flow is important to preventing the drill out system 100 from getting stuck. The plug catcher 122 may be in fluid communication with the well 102 and configured to receive the slurry 114 of debris 112 suspended in the lubricant 110 from the well 102. The plug catcher 122 may be a double barrel plug catcher that includes at least two filtering plug catcher runs. The plug catcher 122 may include a first plug catcher run 124 and a second plug catcher run 126. Each plug catcher run 124, 126 may include a filter configured to remove the debris 112 from the slurry 114 to produce a recycled lubricant 128. The plug catcher 122 may receive the slurry 114 at a first end 123, and the recycled lubricant 128 may exit the plug catcher 122 at a second end 125.

The first plug catcher run 124 may include a first end 130 and a second end 132 opposite the first end. The first end 130 of the first plug catcher run 124 may include a first plug catcher valve 134. The first plug catcher valve 134 can be in an open position which allows slurry 114 to flow into the first plug catcher run 124 or may be in a closed position which prevents slurry 114 from flowing into the first plug catcher run 124.

The second plug catcher run 126 may include a first end 136 and a second end 138 opposite the first end 136. The first end 136 of the second plug catcher run 126 may include a second plug catcher valve 140. The second plug catcher valve 140 can be in an open position which allows slurry 114 to flow into the second plug catcher run 126 or in a closed position which prevents slurry 114 from flowing into the second plug catcher run 126. If the first plug catcher valve 134 is in an open position, the second plug catcher valve 140 may be in a closed position so that only the first plug catcher run 124 receives the slurry 114. Consequently, if the first plug catcher valve 134 is in a closed position, the second plug catcher valve 140 may be in an open position so that only the second plug catcher run 126 receives the slurry 114.

This allows for one run between the first plug catcher run 124 and the second plug catcher run 126 to continuously filter the slurry 114 while the other run is closed so that it may be cleaned and/or inspected. Then, when the plug catcher run 124, 126 with an open valve is in need of cleaning, the open valve may be closed and the closed valve may be opened so that the previously filtering run may be cleaned while the other run continuously filters. The valves may be opened/closed in a particular sequence so as to allow flow to be maintained while isolating the plug catcher run 124, 126 that needs cleaning. Once the clogged plug catcher run 124, 126 is isolated for cleaning, wellbore pressure comprised of hydrocarbons and water is vented into the atmosphere. After venting, an isolation cap is first removed such that the clogged screen can be removed for inspection. If the screen is found to be full of debris 112, the screen is manually cleaned to remove the debris 112 from the screen. Once cleaned, the screen can be reinstalled into its corresponding plug catcher run 124, 126 and ready for operation. During this cleaning and inspection process, the plug catcher run 124, 126 being cleaned is open to the atmosphere. Debris 112 removed during cleaning can be collected for inspection. The opening of one of the first plug catcher valve 134 or the second plug catcher valve 140 may have a pressure differential of between 500 psi to 9,000 psi on them.

During drilling and/or production, the end of the drill 104 at the end of the well 102 may be miles away from the surface opening of the well 102. As a result, debris 112 that is currently produced at the bottom/end of the well 102 may take minutes or even hours to be transported all the to the surface opening of the well 102 and then to the plug catcher 122. This means that it may be minutes or even hours before it can be determined if the drill 104 is operating correctly and directionally correct in the well 102 based on the debris 112 obtained. The plug catcher 122 described herein allows for faster inspection of debris 112 produced in the well 102. Specifically, when a valve is closed in order to isolate a clogged plug catcher run 124, 126, the screen of that clogged catcher run 124, 126 can be removed for inspection. Additionally, or alternatively, debris 112 that is collected in basket 145 may also be inspected to determine if the drill 104 is operating correctly. Here, the debris 112 collected in basket 145 may be continuously inspected to determine the operation of the drill 104. During inspection, the debris 112 is analyzed to determine if the drill 104 is operating correctly in the well 102 based on the specific materials present in the debris 112. If the debris 112 indicates that the drill 104 is not operating correctly, the drill 104 can be adjusted, such as by changing directions, increasing/decreasing drill speed, increasing/decreasing debris 112 pumping, and/or the like.

In some non-limiting embodiments, the first plug catcher valve 134 and the second plug catcher valve 140 each may be a hydraulic valve that is hydraulically operated, thereby relying on pressurized fluids to cycle the first plug catcher valve 134 and the second plug catcher valve 140 between a closed position and an open position. In some non-limiting embodiments, the first plug catcher valve 134 and the second plug catcher valve 140 each may be an electric valve which relies on an electrical connection to cycle the first plug catcher valve 134 and the second plug catcher valve 140 between a closed position and an open position, such as a 3-phase electric actuator valve. As used herein, "cycling" a valve refers to changing the valve between an open position and a closed position.

Figure 5:
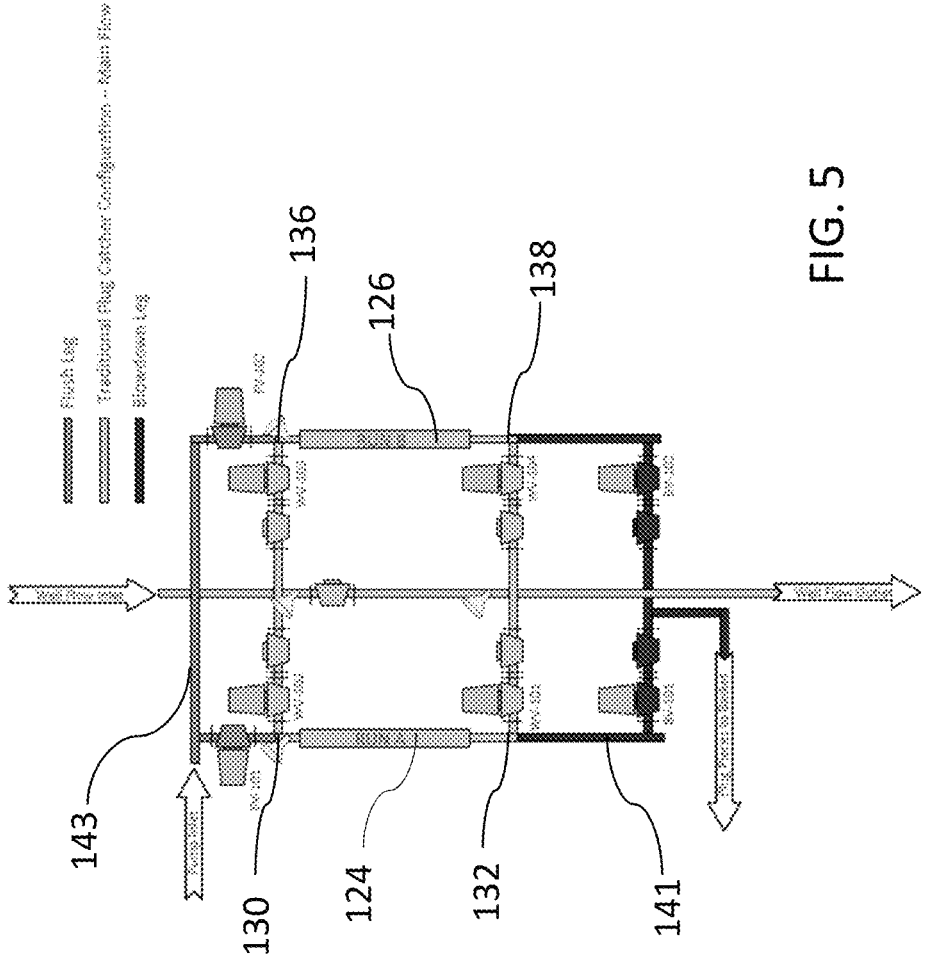
FIG. 5 is a partial schematic view of a drill out system according to another aspect of the present disclosure.
Figure 5:

Referring to FIG. 5, in some non-limiting embodiment, the plug catcher 122 may include additional "legs". Such additional legs allow the system to flush collected plug pieces without manual intervention, which eliminates the risks associated with this task (e.g., unpanned releases, spills, toxic atmospheres, trapped pressures, exposure to these conditions). In some non-limiting embodiments, the plug catcher 122 may include a blowdown leg 141 which is downstream from the first plug catcher run 124 and second plug catcher run 126. The blowdown leg 141 may include two valves, such as valves actuated by the hydraulic unit 151, which are connected to a common line leading to tank 160 or manifold 152. In some non-limiting embodiments, the plug catcher 122 may include a flush leg 143 which is upstream from the first plug catcher run 124 and second plug catcher run 126. The flush leg 143 may include two valves, such as valves actuated by the hydraulic unit 152, which are connected to a common line leading from the well 102. The blowdown leg 141 and flush leg 143 allow the system to use existing fluid on the wellsite to flush and clean debris 112 from the plug catcher 122. This can be done without using wellbore pressure. The flushed debris 112 is collected in a separate strainer basket 145, washed and can then be inspected. The use of load cells will allow the user to know the weight of the collected debris 112 without handling the material.

Referring to FIG. 4, the debris capturing system 120 may further include a controller 142. The controller 142 may be provided to control the operation of the various valves present in the debris capturing system 120 and/or to control which run of the first plug catcher run 124 and second plug catcher run 126 will currently filter and which will be cleaned. The controller 142 may be configured to identify and upset conditions of the debris capturing system 120.

In some non-limiting embodiments, the controller 142 may control the debris capturing system 120 manually. For example, if the first plug catcher valve 134 is in an open position and the second plug catcher valve 140 is in a closed position, a user may provide an input, such as providing an input to the input component 170 described below, to the controller 142 which causes the controller 142 to cycle the first plug catcher valve 134 to a closed position and to cycle the second plug catcher valve 140 to an open position.

In another embodiment, the controller 142 may control the debris capturing system 120 automatically. The controller 142 may control the debris capturing system 120 automatically based on executable software instructions contained in the memory 166 or storage component 168 of the controller 142.

The first end 130 of the first plug catcher run 124 may include a first pressure sensor 144 and the second end 132 of the first plug catcher run 124 may include a second pressure sensor 146. The first pressure sensor 144 may take pressure measurements P1 within the first plug catcher run 124 at the first end 130 and the second pressure sensor 146 may take pressure measurements P2 within the first plug catcher run 124 at the second end 132. The first end 136 of the second plug catcher run 126 may include a third pressure sensor 148 and the second end 138 of the second plug catcher run 126 may include a fourth pressure sensor 150. The third pressure sensor 148 may take pressure measurements P3 within the second plug catcher run 126 at the first end 136 and the fourth pressure sensor 150 may take pressure measurements P4 within the second plug catcher run 126 at the second end 138. The first pressure sensor 144, second pressure sensor 146, third pressure sensor 148 and/or fourth pressure sensor 140 may be in electrical communication with the controller 142 and configured to send data to the controller 142 that includes pressure measurements taken by the first pressure sensor 144, second pressure sensor 146, third pressure sensor 148 and/or fourth pressure sensor 150.

In some non-limiting embodiments, the controller 142 may control the debris capturing system 120 automatically based on pressure measurements received from the first pressure sensor 144 and second pressure sensor 146 and/or the third pressure sensor 148 and fourth pressure sensor 150. If the first plug catcher valve 134 is in an open position, the controller 142 may be configured to cycle the first plug catcher valve 136 and second plug catcher valve 140 based on the pressure measurements P1 of the first pressure sensor 144 and the pressure measurements P2 of the second pressure sensor 146. The controller 142 may cycle the first plug catcher valve 134 to a closed position and the second plug catcher valve 140 to an open position once a first differential pressure P2-P1 exceeds a first maximum differential pressure across the first plug catcher run 124. The first maximum differential pressure may be the highest differential pressure achievable across the first plug catcher run 124 before the controller 142 cycles the first plug catcher valve 136 and the second plug catcher valve 140. The first maximum differential pressure may be dependent on specific well conditions. The first maximum differential pressure may be in the range of from 5 to 70 psi, or 10 to 50 psi, or 10 to 20 psi. For example, the first maximum differential pressure may be 50 psi, or 40 psi, or 30 psi, or 20 psi, or 10 psi. The rising of the first differential pressure P2-P1 or second differential pressure P4-P3 is an indication that the screen within the plug catcher 122 is full of debris 112, such that the plug catcher 122 should be switched to the other run between the first plug catcher run 124 and second plug catcher run 126 so that the screen can be cleaned.

If the second plug catcher valve 140 is in an open position, such as after it was cycled opened after the first maximum differential pressure was achieved, the controller 142 may be configured to cycle the first plug catcher valve 136 and second plug catcher valve 140 based on the pressure measurements P3 of the third pressure sensor 148 and the pressure measurements P4 of the fourth pressure sensor 150. The controller 142 may cycle the first plug catcher valve 134 to an open position and the second plug catcher valve 140 to a closed position once a second differential pressure P4-P3 exceeds a second maximum differential pressure across the second plug catcher run 126. The second maximum differential pressure may be the highest differential pressure achievable across the second plug catcher run 126 before the controller 142 cycles the first plug catcher valve 136 and the second plug catcher valve 140. The second maximum differential pressure may be dependent on specific well conditions. The second maximum differential pressure may be in the range of from 5 to 70 psi, or 10 to 50 psi, or 10 to 20 psi. For example, the second maximum differential pressure may be 50 psi, or 40 psi, or 30 psi, or 20 psi, or 10 psi. The second maximum differential pressure may be the same as or different from the first maximum differential pressure.

The first maximum differential pressure and second maximum differential pressure may be dependent on the well pressure which is dependent on the specific basin. The above ranges for the first maximum differential pressure and the second maximum differential pressure are pressure ranges and values typically for some wells. However, it is also contemplated that the first maximum differential pressure and second maximum differential pressure may be larger, such as 100 psi, or 500 psi, or 1,000 psi, or 5,000 psi, or 10,000 psi.

In some non-limiting embodiments, the controller 142 may provide an output based on pressure measurements received from the first pressure sensor 144 and second pressure sensor 146 and/or the third pressure sensor 148 and fourth pressure sensor 150. For example, if the first plug catcher valve 134 is in an open position, the controller 142 may provide an output, such as from the output component 172, once a first differential pressure P2-P1 exceeds a first maximum differential pressure across the first plug catcher run 124, with said output indicating that the first plug catcher valve 134 should be closed and the second plug catcher valve 140 should be opened so that the first plug catcher run 124 can be cleaned. A user may then provide an input, such as to the input component 170, to the controller 142 to cycle the first plug catcher valve 134 closed and the second plug catcher valve 140 open. Alternatively, a user may manually close the first plug catcher valve 134 and manually open the second plug catcher valve 140 when the output is received using, for example, their hands or a tool. Similarly, if the second plug catcher valve is in an open position, the controller 142 may provide an output, such as from the output component 172, once a second differential pressure P4-P3 exceeds a second maximum differential pressure across the second plug catcher run 126, with said output indicating that the first plug catcher valve 134 should be opened and the second plug catcher vale 140 should be closed so that the second plug catcher run 126 can be cleaned. A user may then provide an input, such as to the input component 170, to the controller 142 to cycle the first plug catcher valve 134 open and the second plug catcher valve 140 closed. Alternatively, a user may manually close the first plug catcher valve 134 and manually close the second plug catcher valve 140 when the output is received using, for example, their hands or a tool.

The controller 142 may continue to cycle the first plug catcher valve 134 and the second plug catcher valve 140 based on the first maximum differential pressure and second maximum differential pressure so that the plug catcher 122 can continuously filter the slurry 114 to produce recycled lubricant 128.

In some non-limiting embodiments, the controller 142 may be a hydraulic controller in hydraulic communication with the first plug catcher valve 134 and the second plug catcher valve 140 which are both hydraulic valves. If the controller 142 is a hydraulic controller, the controller 142 may include a hydraulic unit 151, as shown in FIG. 4. The hydraulic controller 142 may optionally be positioned within the hydraulic unit 151. The hydraulic unit 151 may be in electrical communication with the controller 142 and hydraulic communication with the first hydraulic plug catcher valve 134 and the second hydraulic plug catcher valve 140. The hydraulic unit 151 may receive information including a command from the controller 142 to cycle the first hydraulic plug catcher valve 134 and the second hydraulic plug catcher valve 140 and then may vary the pressure of a fluid in the hydraulic lines to cycle the position of the first hydraulic plug catcher valve 134 and the second hydraulic plug catcher valve 140. The hydraulic unit 151 includes a fluid reservoir, pump, and motor. The hydraulic unit 151 may include accumulator bottles for stored power in the event of a prolonged power loss. The hydraulic unit 151 may include a battery backup to ensure short-term power disruptions do not affect operations. Communication with the with controller 142 may be enable via wired electrical connections and/or by cellular modems and local Wi-Fi® capabilities. The hydraulic unit 151 may include built-in limit switches, adjustable for desired hydraulic pressure output. Datalogs and timestamps can be built into the system, such that all actions are recorded.

In some non-limiting embodiments, the controller 142 may be an electric controller that is in electrical communication with the first plug catcher valve 134 and the second plug catcher valve 140 which are both electric valves. In such an embodiment, the controller 142 may directly cause the first plug catcher valve 134 and the second plug catcher valve 140 to cycle between an open position and a closed position.

Referring to FIG. 4, in some non-limiting embodiments, the debris capturing system 120 may include a manifold 152. The manifold 152 may be in fluid communication with the second end 125 of the plug catcher 122 and receive the recycled lubricant 128 from the second end 125 of the plug catcher 122. The manifold 152 may include piping and valves that control fluid returns and pressures from the well 102 and plug catcher 122 during drill out operation. The manifold 152 may be a choke manifold, which allows restriction of flow by inserting or adjusting assorted sizes of orifices or chokes. For example, the manifold 152 may include an auto choke to maintain desired fluid returns. The auto choke can be run remotely or automatically. In some non-limiting embodiments, intermittent flow control valves may be provided downstream of the manifold 152 to allow for planned shut ins, such as when flow is required to be stopped when making or breaking drill pipe connections.

The manifold 152 may include a plurality of output streams 154. Each output stream 154 may be configured to connect to another component of the debris capturing system 120 to provide recycled lubricant 128 to another component of the debris capturing system 120. The manifold 152 may include a plurality of manifold valves 156 that are in communication with the controller 142, with a manifold valve 156 of the plurality of manifold valves 156 positioned on each of the output streams 154 of the plurality of output streams 154. In some non-limiting embodiments, the plurality of manifold valves 156 may be hydraulic valves that are in hydraulic communication with the hydraulic controller 142. In some non-limiting embodiments, the plurality of manifold valves 156 may be electric valves that are in electrical communication with the controller 142, such as a 3-phase electric actuator valve.

The controller 142 may be configured to cycle the manifold valves 156 between an open position and a closed position manually or automatically. For example, the controller 142 may cycle the manifold valves 156 manually when an operator provides an input to the controller 142, such as providing an input to the input component 170 described below. The controller 142 may be configured to cycle at least one of the manifold valves 156 to an open position and at least one of the manifold valves 156 to a closed position when an operator provides an input to the controller 142, such as to the input component 170.

The controller 142 may be configured to cycle the manifold valves 156 automatically. For example, the controller 142 may be configured to cycle the manifold valves 156 automatically after a predetermined amount of time. The controller 142 may be configured to cycle at least one of the manifold valves 156 to an open position and at least one of the manifold valves 156 to a closed position automatically.

In some non-limiting embodiments, some debris 112 may make it through the plug catcher 122 and into the manifold 152. Once detected, the manifold valves 156 may be cycled such that the flow containing the debris 112 can be redirected for inspection. In some non-limiting embodiments, all of the manifold valves 156 may be closed to stop flow completely, such as during stick pipe operations while drill pipe connections are made.

In some non-limiting embodiments, the debris capturing system 120 may include a generator 158, as shown in FIG. 4. The generator 158 may be in electrical communication with the controller 142, the plug catcher 122, and the manifold 152 and configured to be a source of electrical power for the debris capturing system 120.

The debris capturing system 120 may include a tank 160, as shown in FIG. 4. The tank 160 may be any vessel capable of retaining a volume of liquid. The tank 160 may be in fluid communication with an output stream 154 of the plurality of output streams 154 and configured to receive the recycled lubricant 128 from an output stream 154 on the manifold 152. The tank 160 may be in fluid communication with the plug catcher 122. In some non-limiting embodiments, the tank 160 may receive the recycled lubricant 128 directly from the plug catcher 122. The tank 160 may be configured to receive and retain a volume of the recycled lubricant 128. In some non-limiting embodiments, the tank 160 may include a plurality of tanks so as to retain a greater volume of recycled lubricant 128.

In some non-limiting embodiments, the debris capturing system 120 may include a plurality of tanks 160, 180, 182, 184. The debris capturing system 120 may include any number of tanks 160, 180, 182, 184, and may include additional tanks other than the plurality of tanks 160, 180, 182, 184. Each tank of the plurality of tanks 160, 180, 182, 184 may be in fluid communication with one another and connected in series, as shown in FIG. 4. For example, the debris capturing system 120 may include a plurality of tanks 160, 180, 182, 184, where tank 160 is a flowback gas buster tank 160. The flowback gas buster tank 160 may be a tank that is capable of venting gases present and trapped in the tank 160. In some non-limiting embodiments, the tanks 180 and 182 may each be a settling tank 180, 182. The settling tanks 180, 182 may be tanks capable of minimizing agitating of the liquid present therein, thereby allow separation of various components through settling. In some non-limiting embodiments, the tank 184 may be a working tank 184. The working tank 184 may be the final tank in the series of the plurality of tanks 160, 180, 182, 184. The working tank 184 may be configured to retain a volume of liquid and then supply the liquid to external of the working tank 184 when desired, such as to a downstream process. For example, the working tank 184 may be configured to supply the retained liquid, such as recycled lubricant 128, downstream for further use, such as to the rig pump 188. The debris capturing system 120 may further include a flow switch 186. The flow switch 186 may be capable of allowing/preventing liquid from flowing from the at least one tank 160, such as from the plurality of tanks 160, 180, 182, 184, such as allowing/preventing recycled lubricant 128 from flowing from the working tank 184. For example, when the flow switch 186 is in an "open" position, the flow switch 186 may allow liquid, such as recycled lubricant 128, to flow from the tank 160, or working tank 184 if a plurality of tanks 160, 180, 182, 184, downstream, such as to the rig pump 188. When the flow switch 186 is in a "closed" position, the flow switch 186 may prevent liquid, such as recycled lubricant 128, from flowing from the tank 160, or working tank 184 if a plurality of tanks 160, 180, 182, 184. In some non-limiting embodiments, the tank 160, such as the plurality of tanks 160, 180, 182, 184, may be in fluid communication with the rig pump 188. The rig pump 188 may be capable of supplying lubricant 110 and/or recycled lubricant 128 into the well 102. In this regard, the tank 160, such as the working tank 184 if a plurality of tanks 160, 180, 182, 184, may supply recycled lubricant back to the rig pump 188 so that the rig pump 188 may supply the recycled lubricant 128, optionally along with lubricant 110, to the well 102.

The appropriate fluid return rate for each well 102 may be independently determined based on each individual operation. The appropriate fluid return rate may differ from wellsite to wellsite, and may depend on the number of tanks 160, 180, 183, 184 present downstream. For example, the flowback rate may be 5 barrels (bbl)/min or more. The fluid return rate may be determined by measuring the volume in tank 160 at a set time and then waiting a period of time to measure again, then simply dividing the fluid gain or loss in volume by the amount of time elapsed. The return rate may need adjusted during different times of operation and at different points within the well 102. The manifold 152 may be adjusted to restrict or allow flow via orifices or chokes in order to vary the return rate.

Figure 6:
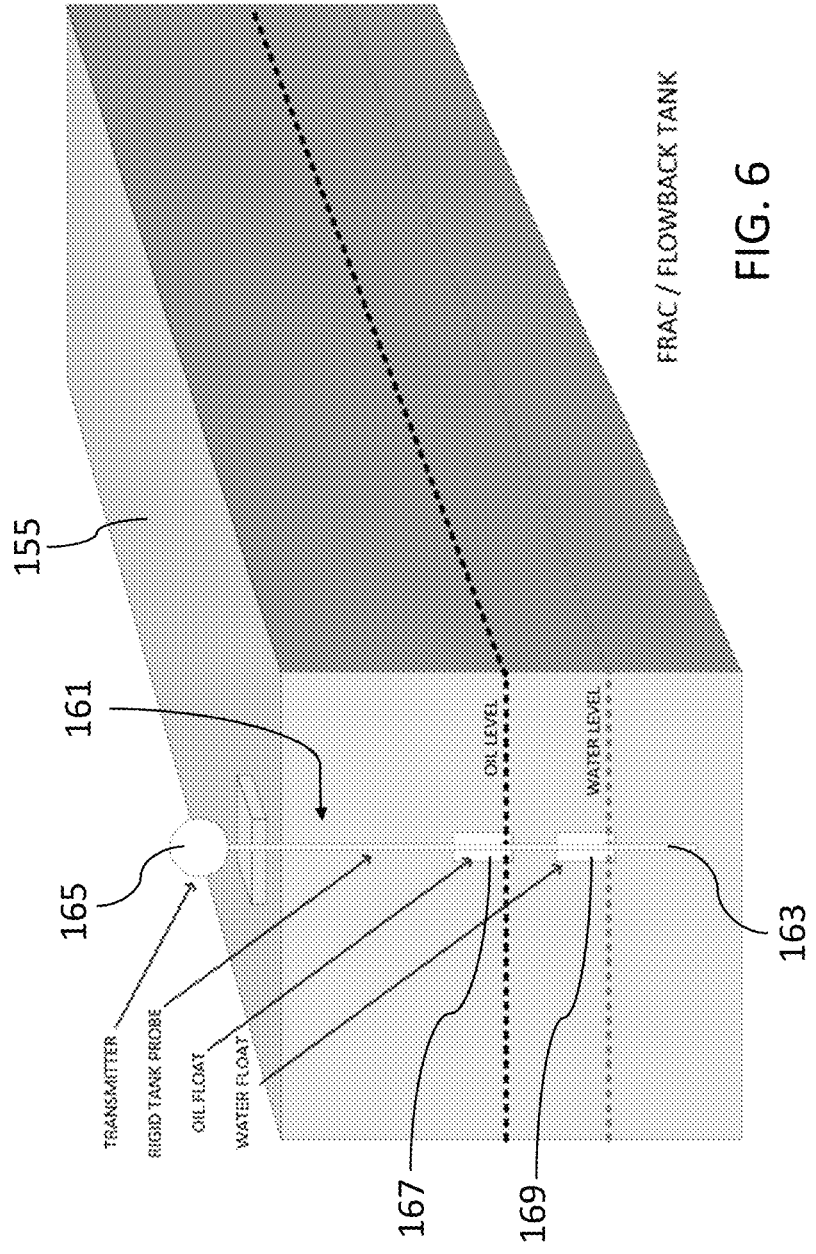
FIG. 6 is a partial schematic view of a drill out system according to another aspect of the present disclosure.

Referring to FIGS. 4 and 6, in some non-limiting embodiments, the debris capturing system 120 may include a recirculation tank 155. The recirculation tank 155 may be in fluid communication with both the first end 123 and the second end 125 of the plug catcher 122. The recirculation tank 155 may receive a fluid from the second end 125 of the plug catcher 122. The fluid may be the fluid produced after flushing of the first plug catcher run 124 and/or second plug catcher run 126. The recirculation tank 155 may hold a volume of the fluid in the recirculation tank 155 for an amount of time before supplying the fluid back to the first end 123 of the plug catcher 122. In some non-limiting embodiments, the recirculation tank 155 may supply water, lubricant 128, or a combination thereof back to the first end 123 of the plug catcher 122.

In some non-limiting embodiments, the recirculation tank 155 and/or plurality of tanks 160, 180, 182, 184 each may include a tank level indicator 161. The tank level indicator 161 may include a tank probe 163 that extends into the volume of the recirculation tank 155 and/or plurality of tanks 160, 180, 182, 184. The tank level indicator 161 may include a transmitter 165 positioned on an end of the tank probe 163 that extends out of the volume of the recirculation tank 155 and/or plurality of tanks 160, 180, 182, 184. The tank level indicator 161 may include an oil level float 167 positioned on the tank probe 163 and a water level float 169 on the tank probe 163 and positioned on the tank probe 163 closer to the bottom of the recirculation tank 155 and/or plurality of tanks 160, 180, 182, 184 compared to the oil level float 167. It is known that when recycled lubricant 128 and water are present in the recirculation tank 155 and/or plurality of tanks 160, 180, 182, 184 together, the recycled lubricant 128 will float atop the water volume. Consequently, the positioning of the oil level float 167 and the water level float 169 allow for the water level float 169 to rest on the surface of the water volume, while the oil level float 167 rests on the surface of the recycled lubricant 128 volume. Based on the level of the oil level float 167 and/or the water level float 169, the tank probe 163 of the tank level indicator 161 can determine the total volume of water (i.e., the level of the water level float 169), the total volume of fluid (i.e., the level of the oil level float 167), and/or the total volume of recycled lubricant 128 (i.e., subtracting the water level float 169 level from the oil level float 167 level). The transmitter 165 may be configured to send the data from the tank probe 163 (e.g., the total volume of water, the total volume of fluid, and/or the total volume of recycled lubricant 128) to the controller 142. The transmitter 165 may be in electrical communication with the controller 142 via wired or wireless connections.

Referring to FIG. 4, in some non-limiting embodiments, the debris capturing system 120 may include a basket 145. The basket 145 may work in conjunction with the plug catcher 122, with the debris 112 removed from the first plug catcher run 124 and/or second plug catcher run 126 being collected in the basket 145 for inspection, such as after flushing the first plug catcher run 124 and/or second plug catcher run 126. The basket 145 may include load cells, which will report and log accumulated volumes of collected debris 112. In some non-limiting embodiments, the basket 145 may be present between the plug catcher 122 and a recirculation tank 155 and in fluid communication with the plug catcher 122 and the recirculation tank 155. In this regard, the basket 145 receives a fluid containing a combination of water, lubricant, and debris from the plug catcher 122, removes at least a portion of the debris from the fluid, and transports the fluid without the debris to the recirculation tank 155.

In some non-limiting embodiments, piping may be provided to connect and provide fluid communication between various components of the drill out system 100 and/or debris capturing system 120. In this regard, the piping allows transportation of a fluid, such as slurry 114 and/or recycled lubricant 128, to be transported between components of the drill out system 100. The piping may be provided to provide fluid communication between components including the drill 104, the plug catcher 122, the manifold, 152, the tanks 160, 180, 182, 184, 186, the basket 145, and/or recirculation tank 155. The piping may provide fluid communication between the drill 104 and the plug catcher 122, between the plug catcher 122 and the manifold 152, between the manifold 152 and any of the plurality of tanks 160, 180, 182, 184, 186, between each of the plurality of tanks 160, 180, 182, 184, 186, between any of the plurality of tanks and the ring pump 188, between the rig pump 188 and the drill 104, between the plug catcher 122 and the basket 145, between the basket 145 and the recirculation tank 155, and/or between the recirculation tank 155 and the plug catcher 122.

In some non-limiting embodiments, the piping may be non-flanged piping. For example, the drill out system 100 may not include any flanged piping. As used herein, "flanged" piping refers to piping that includes a protruding rim on one or more ends of the piping for attaching the flanged pipe to another flanged pipe via the protruding rim using a fastener. Consequently, "non-flanged" piping refers to piping that does not include a protruding rim on one or more ends of the piping for attaching the flanged pipe to another flanged pipe via the protruding rim using a fastener. For example, the non-flanged piping may include threaded piping. As used herein, "threaded" piping refers to piping that includes threaded connections at the ends of each pipe such that the pipes may be attached to one another via the threaded ends. In some non-limiting embodiments, threaded piping may be hammer union threaded piping. As used herein, "hammer union" threaded piping refers to threaded piping that is connected with the aid of a hammer union process which includes striking the connection point with a hammer, or similar object, while the connection between the pipes is tightened. In some non-limiting embodiments, the hammer union threaded piping may be FIG. 1502 hammer union threaded piping, which is a specific type of hammer union that meets a set of industry standards as set forth by the American Petroleum Institute (API). Alternatively, the piping may be welded together, such that the piping does not include any connection means at either end.

Referring to FIG. 4, the controller 142 may be interconnected with the various components of the debris capturing system 120 to establish a connection to communicate with various components of the debris capturing system 120, including wired connections, wireless connections, or combinations thereof. The controller 142 may be a device capable of communicating with the debris capturing system 120, such as the plug catcher valves 134, 140, the pressure sensors 144, 146, 148, 150, manifold valves 156, hydraulic unit 151 (if present), and/or the generator 158. The controller 142 may include various components commonly associated with control devices, such as a processor, integrated circuit, and the like.

The controller 142 may receive data from one or more components of the debris capturing system 120. For example, the controller 142 may receive pressure information from the first pressure sensor 144, the second pressure sensor 146, the third pressure sensor 148, and/or the fourth pressure sensor 150. The controller may receive positioning information from the plug catcher valves 134, 140 and/or the manifold valves 156 such that the controller 142 can determine if each of the valves is in a closed position or an open position. The controller 142 may receive level information from the tank level indicator 161, which indicates the level of water, the level of recycled lubricant 128, and/or the total volume of fluid in the recirculation tank 155. For example, the controller 142 may include limit switches which allow confirmation of the actual valve position. In some non-limiting embodiments, the controller 142 may provide commands to one or more components of the debris capturing system 120. For example, the controller 142 may provide commands to the first plug catcher valve 134, the second plug catcher valve 140, and/or the manifold valves 156 to cycle said valve(s) independently between a closed position and an open position. In another example, the controller 142 may provide commands to the hydraulic unit 151 such that the hydraulic unit 151 uses its hydraulic communication with the first plug catcher valve 134, the second plug catcher valve 140, and/or the manifold valves 156 to cycle the first plug catcher valve 134, the second plug catcher valve 140, and/or the manifold valves 156 between a closed position and an open position.

In some non-limiting embodiments, the controller 142 may provide commands based on the information received from the one or more components of the debris capturing system 120, such as from the pressure sensors 144, 146, 148, 150, the plug catcher valves 134, 140, and/or the manifold valves 156. For example, the controller 142 may receive pressure information P1, P2 from the first pressure sensor 144 and second pressure sensor 146 and/or pressure information P3, P4 from the third pressure sensor 148 and fourth pressure sensor 150, calculate a first differential pressure P2-P1 based on the pressure information received from the first pressure sensor 144 and second pressure sensor 146 and/or calculate a second differential pressure P4-P3 based on the pressure information received from the third pressure sensor 148 and fourth pressure sensor 150. If the first differential pressure P2-P1 and/or the second differential pressure P4-P3 exceeds the first maximum differential pressure and/or second maximum differential pressure respectively, the controller 142 may provide commands to close the plug catcher valve that is open and open the plug catcher valve that is closed between the first plug catcher valve 134 and second plug catcher valve 140. This may be done by either directly commanding the first plug catcher valve 134 and second plug catcher valve 140 or by commanding the hydraulic unit 151 to cycle the first plug catcher valve 134 and second plug catcher valve 140. In some non-limiting embodiments, the controller 143 may not receive information from one or more components of the debris capturing system 120 and therefore provides commands without receiving such information from one or more components of the debris capturing system 120. In some non-limiting embodiments, in addition to the pressure measurements from the pressure sensors 144, 146, 148, 150, the controller 142 may receive positioning information from the first plug catcher valve 134 and/or second plug catcher valve to aid in determining which valve of the first plug catcher valve 134 and the second plug catcher valve 140 to open and which to close. In some non-limiting embodiments, the controller 142 may receive positioning information (i.e., whether the valve is closed or open) from the plurality of manifold valves 156 and command the plurality of manifold valves 156 to cycle between an open position and a closed position based on this positioning information.

Figure 7:
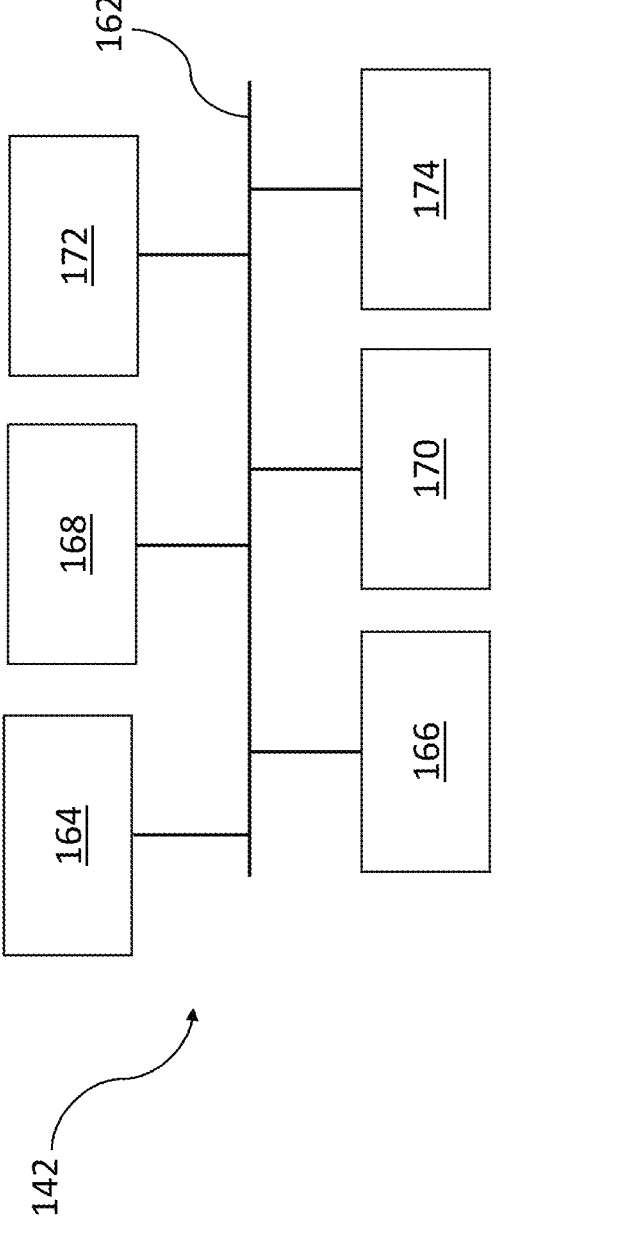
FIG. 7 is a diagram of a controller according to another aspect of the present disclosure.

Referring to FIG. 7, a diagram of a controller 142 according to one non-limiting embodiment is provided. The controller 142 may include various components known to be associated and/or included in a control device. For example, the controller 142 may include a bus 162, a processor 164, memory 166, a storage component 168, an input component 170, an output component 172, and/or a communication interface 174. The bus 162 may be a component that allows communication among the various other components of the controller 142. The processor 164 may be a processor, microprocessor, and/or similar component capable of being programmed to perform a function. The memory 166 may be various types of memory known in the art, such as random access memory (RAM), read-only memory (ROM), and/or the like. The storage component 168 may be a component that can store information and/or software for the controller 142, such as a hard disk, compact disk (CD), digital versatile disc (DVD), floppy disk, and/or like computer-readable medium. The storage component 168 may include a drive for receiving and holding the storage component 168.

The input component 170 may be a component that allows the controller 142 to receive information, such as receiving a user input. For example, the input component can be a touchscreen display, a button, a mouse, a keyboard, a switch, a microphone, and/or the like. The output component 172 may include a component that can provide output information from the controller 142, such as a display, a speaker, a light (e.g., LEDs), and/or the like. The communication interface 174 may include a transceiver-like component, such as a transceiver, a receiver and transmitter, and/or the like which allows communication between the controller 142 and other devices and/or components of the debris capturing system 120. This communication can be enabled via wired connection, wireless connection, or a combination thereof. The communication interface 174 may allow the controller 142 to receive information from one or more components of the debris capturing system 120 and/or provide information, such as commands, to one or more components of the debris capturing system 120. The communication interface 172 may include an ethernet interface, optical interface, coaxial interface, infrared interface, radio frequency (RF) interface, universal serial bus (USB) interface, Wi-Fi® interface, Bluetooth® interface, Zigbee® interface, cellular network interface, and/or the like.

The controller 142 may perform one or more processes as described herein. The controller 142 may perform a process based on the processor 164 executing software instructions that are stored by a computer-readable medium, such as the memory 166 and/or the storage component 168. A computer-readable medium is defined herein as a non-transitory memory device which includes memory space spread across multiple physical storage components. These software instructions may be read into the memory 166 and/or the storage component 168 from another computer-readable medium and/or from another component via the communication interface 172. When executed, the software instructions may cause the processor 164 to perform the one or more processes. Additionally, or alternatively, hardwired circuitry can be used to perform one or more processes. The controller 142 may be capable of performing one or more actions based on performing one or more processes, including actions involving other components of the debris capturing system 120. The memory 166 and/or storage component 168 may include data storage capabilities or one or more data structures or databases such that the controller 142 can receive information from, store information in, communicate information to, or search for information in the data storage or data structures of the memory 166 and/or storage component 168.

The controller 142 is not limited to the arrangement or number of components shown in FIG. 7, and may include additional or fewer components and/or different components than shown in FIG. 7. In some non-limiting embodiments, one or more components of the controller 142 may perform a function described as being performed by another component of the controller 142.

Figure 8:
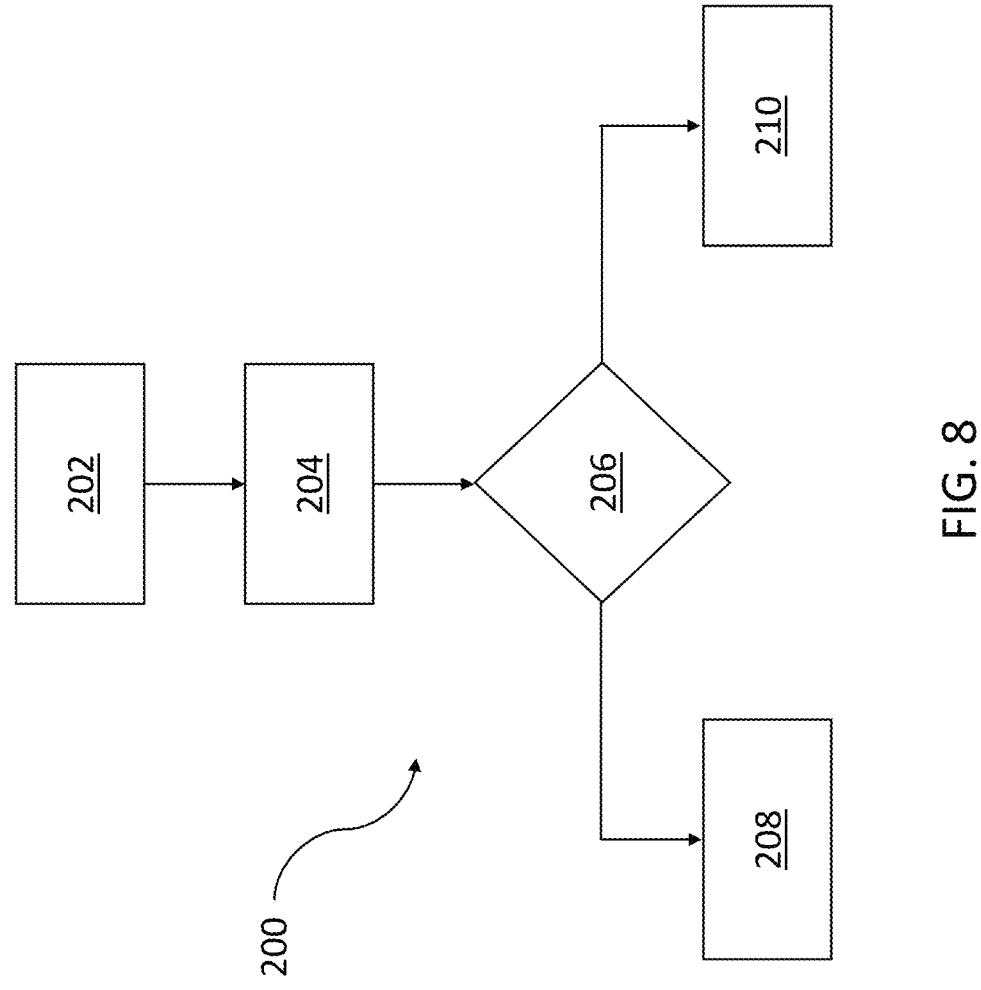
FIG. 8 is a diagram of a process to be performed by the controller according to another aspect of the present disclosure.

Referring to FIG. 8, a flowchart of a non-limiting embodiment of a process 200 performed by the controller 142 is provided. Alternatively, one or more steps of the process 200 may be performed by a component different from the controller 142.

In step 202, the process 200 may include receiving data associated with a component. For example, the controller 142 may receive data associated with the first pressure sensor 144 (e.g., first pressure measurement P1), second pressure sensor 146 (e.g., second pressure measurement P2), third pressure sensor 148 (e.g., third pressure measurement P3), and/or fourth pressure sensor 150 (e.g., fourth pressure measurement P4). The data received from the first pressure sensor 144, second pressure sensor 146, third pressure sensor 148, and/or fourth pressure sensor 150 may be pressure measurements determined during the course of operation of the pressure sensors. In some non-limiting embodiments, the controller 142 may receive data associated with the first plug catcher valve 134 and/or the second plug catcher valve 140. The data received from the first plug catcher valve 134 and/or the second plug catcher valve 140 may be positioning information that indicates whether the first plug catcher valve 134 and/or the second plug catcher valve 140 are in a closed position or an open position. In some non-limiting embodiments, the controller 142 may receive data associated with the one or more of the plurality of manifold valves 156. The data received from the one or more of the plurality of manifold valves 156 may be positioning information that indicates whether the one or more of the plurality of manifold valves 156 are in a closed position or an open position, with said positioning being confirmed by outputting this data to limit switches on the controller 142. In some non-limiting embodiments, after an action is performed, the controller 142 may receive data associated with the performed action, such as new positioning information associated with the first plug catcher valve 134 and/or second plug catcher valve 140 and/or the one or more of the plurality of manifold valves 156, after said valve(s) had been cycled by the performed action. In some non-limiting embodiment, the controller 142 may receive data associated with the tank level indicator 161. The data received from the tank level indicator 161 may be volume information that indicates the level of water in the recirculation tank 155, the level of recycled lubricant 128 in the recirculation tank 155, and/or the total level of all fluid in the recirculation tank 155.

In step 204, the process 200 may include determining a characteristic of a component. In some non-limiting embodiments, the controller 142 may determine a characteristic of a component based on the data received from the first pressure sensor 144, second pressure sensor 146, third pressure sensor 148, and/or fourth pressure sensor 150. The characteristic may be a first differential pressure P2-P1 across the first plug catcher run 124 and/or a second differential pressure P4-P3 across the second plug catcher run 126. For example, the controller 142 may determine a first differential pressure P2-P1 across the first plug catcher run 124 by subtracting the first pressure measurement P1 of the first pressure sensor 144 from the second pressure measurement P2 of the second pressure sensor 146. In another example, the controller 142 may determine a second differential pressure P4-P3 across the second plug catcher run 126 by subtracting a third pressure measurement P3 of the third pressure sensor 148 from the fourth pressure measurement P4 of the fourth pressure sensor 150. In some non-limiting embodiments, the controller 142 may determine a characteristic of the first plug catcher valve 134 and/or the second plug catcher valve 140 based on the data received from the first plug catcher valve 134 and/or the second plug catcher valve 140. For example, the controller 142 may determine a position (e.g., closed or open) of the first plug catcher valve 134 and/or the second plug catcher valve 140 based on the positioning information received from the first plug catcher valve 134 and/or the second plug catcher valve 140. In some non-limiting embodiments, the controller 142 may determine a characteristic of the plurality of manifold valves 156 based on the data received from the plurality of manifold valves 156. For example, the controller 142 may determine a position (e.g., closed or open) of each of the plurality of manifold valves 156 based on the positioning information received from the plurality of manifold valves 156. In some non-limiting embodiments, the controller 142 may determine a characteristic of the recirculation tank 155 based on the data received from the tank level indicator 161. The characteristic of the recirculation tank 155 may be level of recycled lubricant 128 present in the recirculation tank 155. For example, the controller 142 may determine a level of recycled lubricant 128 by subtracting the level of water received from the tank level indicator 161 from the level of total fluid in the recirculation tank 155 received from the tank level indicator 161.

The controller 142 enables monitoring of the first differential pressure P2-P1 and/or second differential pressure P4-P3. This eliminates the need for an operator to open the plug catcher 122 filed with slurry 116 to inspect the screens which would expose the operator to toxic gases. In the present configuration, the plug catcher 122 would only need opened when a plug catcher run 124, 126 would need cleaned.

In step 206, process 200 may include determining whether the characteristic of the component satisfies a threshold. In some non-limiting embodiments, the controller 142 may determine whether the first differential pressure P2-P1 across the first plug catcher run 124 satisfies the first maximum differential pressure. The first differential pressure P2-P1 would satisfy the threshold of the first maximum differential pressure if the first differential pressure P2-P1 exceeds the first maximum differential pressure. In some non-limiting embodiments, the controller 142 may determine whether the second differential pressure P4-P3 across the second plug catcher run 126 satisfies the second maximum differential pressure. The second differential pressure P4-P3 would satisfy the threshold of the second maximum differential pressure if the second differential pressure P4-P3 exceeds the second maximum differential pressure.

In some non-limiting embodiments, the step 206 may include determining whether the positioning information from the plurality of manifold valves 156 satisfies a threshold of a predetermined positioning configuration of the plurality of manifold valves 156. The predetermined positioning configuration of the plurality of manifold valves 156 is the desired positioning (e.g., open or closed) of each of the manifold valves of the plurality of manifold valves 156 as input into the controller 142. The positioning information is said to satisfy the threshold if the positioning of the plurality of manifold valves 156 does not match the positioning of the predetermined positioning configuration of the plurality of manifold valves 156. The positioning information is said to not satisfy the threshold if the positioning of the plurality of manifold valves 156 matches the positioning of the predetermined positioning configuration of the plurality of manifold valves 156.

In some non-limiting embodiments, the step 206 may include whether the level of recycled lubricant 128 in the recirculation tank 155, the total level of fluids in the recirculation tank 155, or the level of water in the recirculation tank 155 satisfies a threshold of a maximum tank level. As used herein, the "maximum tank level" is the maximum level of recycled lubricant 128, water, or total fluids allowed to be present in the recirculation tank 155 before the at least a portion of the volume in the recirculation tank 155 is required to be supplied back to the first end 123 of the plug catcher 122. The level of recycled lubricant 128 in the recirculation tank 155, the level of water in the recirculation tank 155, or the total level of fluids in the recirculation tank 155 is said to satisfy the threshold if the level of recycled lubricant 128 in the recirculation tank 155, the level of water in the recirculation tank 155, or the total level of fluids in the recirculation tank 155 exceeds the maximum tank level.

In step 208, process 200 may include performing an action based on determining that the characteristic satisfies the threshold. As used herein, "activating" the controller 142 refers to causing the controller 142 to perform one or more actions. As used herein, "reactivating" the controller 142 refers to causing the controller 142 to perform one or more actions after the controller 142 had previously performed one or more actions. In some non-limiting embodiments, the controller 142 may perform an action based on determining that a characteristic associated with the first plug catcher run 124 and/or second plug catcher run 126 satisfies a threshold. In some non-limiting embodiments, the controller 142 may require a user to provide an input to the input component 170 of the controller 142 in order to confirm that the controller 142 is to perform an action.

The controller 142 may perform an action based on determining that a first differential pressure P2-P1 across the first plug catcher run 124 satisfies the threshold of the first maximum differential pressure, such that the first differential pressure P2-P1 exceeds the first maximum differential pressure. The controller 142 may perform the action by cycling the first valve 134 from an open position to a closed position and the second valve 140 from a closed position to an open position. The controller 142 may perform an action based on determining that a second differential pressure P4-P3 across the second plug catcher run 126 satisfies the threshold of the second maximum differential pressure, such that the second differential pressure P4-P3 exceeds the second maximum differential pressure. The controller 142 may perform the action by cycling the first valve 134 from a closed position to an open position and the second valve 140 from an open position to a closed position. Consequently, when a threshold is reached, the controller 142 may be configured to perform one or more of the actions described herein (e.g., cycling more than one valve). In some non-limiting embodiments, the controller 142 may perform an action based on the first differential pressure P2-P1 and/or the second differential pressure P4-P3 with the aid of the positioning information from the first plug catcher valve 134 and/or the second plug catcher valve 140 which aids in determining which valve should be opened and which should be closed.

In some non-limiting embodiments, the controller 142 may perform an action based on determining that the level of recycled lubricant 128 in the recirculation tank 155, the level of water in the recirculation tank 155, or the total level of fluids in the recirculation tank 155 satisfies the threshold of the maximum tank level. The controller 142 may perform the action by cycling a valve on the recirculation tank 155 open for a period of time such that at least a portion of the retained fluid volume within the recirculation tank 155 is supplied to the first end 123 of the plug catcher 122.

In some non-limiting embodiments, the controller 142 may perform an action based on the new positioning information of the first plug catcher valve 134 and/or second plug catcher valve 140. For example, the controller 142 may flush the plug catcher run between the first plug catcher run 124 and second plug catcher run 126 that is ready for cleaning based on the new positioning information of the first plug catcher valve 134 and/or second plug catcher valve 140. If the controller 142 determines that one of the first plug catcher valve 134 or second plug catcher valve 140 has recently closed and therefore is ready for cleaning, the controller 142 may be configured to open the blowdown leg 141 on the corresponding plug catcher run to depressurize the plug catcher run (i.e., either the first plug catcher run 124 or second plug catcher run 126). Once the blowdown leg 141 on the corresponding plug catcher run is opened, the controller 142 may then open the flush leg 143 of the corresponding plug catcher run. In some non-limiting embodiments, if the controller 142 determines that trapped pressure exists in the flush leg 143, the flush leg 143 will not be opened and the output will be provided to the output component 172 of the controller 142 indicating that the flush leg 143 was not opened. If the flush leg 142 of the corresponding plug catcher run is opened, the controller 142 may then activate a flush pump that would begin cleaning the plug catcher run of debris 112. The controller 142 may stop the flushing action by stopping the flush pump from further cleaning the plug catcher run. The controller 142 may perform the steps of the flushing action automatically based on determining the new positioning information of the first plug catcher valve 134 and/or second plug catcher valve 140. Alternatively, the controller may perform the steps of the flushing action based on inputs from a user, such as to an input component 170 of the controller 142.

The controller 142 may perform an action based on determining that the plurality of manifold valves 156 satisfies the threshold of the predetermined positioning configuration of the plurality of manifold valves 156. The controller 142 may perform the action by cycling the plurality of manifold valves 156 between an open position and a closed position. For example, the controller 142 may perform the action by cycling at least one of the manifold valves of the plurality of manifold valves 156 open and cycling at least one of the manifold valves of the plurality of manifold valves 156 closed.

In some non-limiting embodiments, the controller 142 may perform an action without determining that the characteristic satisfies/does not satisfy a threshold. For example, the controller 142 may provide an output, such as an output from the output component 172, based on the data received from the first pressure sensor 144 (e.g., first pressure measurement P1), second pressure sensor 146 (e.g., second pressure measurement P2), third pressure sensor 148 (e.g., third pressure measurement P3), and/or fourth pressure sensor 150 (e.g., fourth pressure measurement P4), from the first plug catcher valve 134 and/or second plug catcher valve 140, and/or from the plurality of manifold valves 156. The output provided by the output component 172 may be a display of the first pressure measurement P1, second pressure measurement P2, third pressure measurement P3, fourth pressure measurement P4, the positioning of the first plug catcher valve 134, the positioning of the second plug catcher valve 140, and/or the positioning of each of the manifold valves of the plurality of manifold valves 156. In some non-limiting embodiments, the controller 142 may determine the first differential pressure P2-P1 based on the first pressure measurement P1 and second pressure measurement P2 and/or the second differential pressure P4-P3 based on the third pressure measurement P3 and fourth pressure measurement P4, and display the first differential pressure P2-P1 and/or the second differential pressure P4-P3 via the output component 172. In some non-limiting embodiments, the controller 142 may provide an output, such as an output from the output component 172, based on the data received from the tank level indicator 161. The output provided by the output component 172 may be a display of the of the level of water in the recirculation tank 155, the level of recycled lubricant 128 in the recirculation tank 155, or the total level of fluids in the recirculation tank 155. In some non-limiting embodiments, the controller 142 may determine the level of recycled lubricant 128 in the recirculation tank 155 based on the level of water in the recirculation tank 155 and the total level of fluids in the recirculation tank 155, and display the level of recycled lubricant 128 via the output component 172.

At step 210, the process 200 may include foregoing performing an action based on determining that a characteristic associated with a component does not satisfy a threshold. The controller 142 may forego performing an action based on determining that a characteristic associated with the first plug catcher run 124 and/or the second plug catcher run 126 does not satisfy a threshold. The controller 142 may forgo performing an action, such as cycling the first valve 134 and the second valve 140, based on determining that a first differential pressure P2-P1 across the first plug catcher run 124 does not satisfy the threshold of the first maximum differential pressure, such that the first differential pressure P2-P1 does not exceed the first maximum differential pressure. The controller 142 may forgo performing an action, such as cycling the first valve 134 and the second valve 140, based on determining that a second differential pressure P4-P3 across the second plug catcher run 126 does not satisfy the threshold of the second maximum differential pressure, such that the second differential pressure P4-P3 does not exceed the second maximum differential pressure. In some non-limiting embodiments, the controller 142 may forgo performing an action based on the first differential pressure P2-P1 and/or the second differential pressure P4-P3 with the aid of the positioning information from the first plug catcher valve 134 and/or the second plug catcher valve 140.

In some non-limiting embodiments, the controller 142 may forgo performing an action, such as cycling the plurality of manifold valves 156, based on determining that the positioning information from the plurality of manifold valves 156 does not satisfy the threshold of the predetermined positioning configuration of the plurality of manifold valves 156.

In some non-limiting embodiments, the controller 142 may forgo performing an action, such as cycling a valve on the recirculation tank 155 to supply at least a portion of the retained fluid volume to the first end 123 of the plug catcher 122, based on determining that the level of recycled lubricant 128 in the recirculation tank 155, the level of water in the recirculation tank 155, or the total level of fluids in the recirculation tank 155 does not satisfy the threshold of the maximum tank level.

Figure 9:
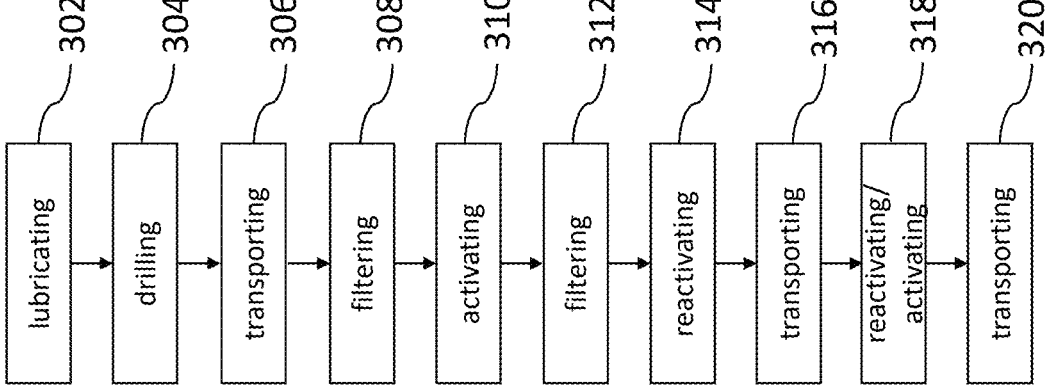
FIG. 9 is a diagram of a method according to another aspect of the present disclosure.
Figure 9:
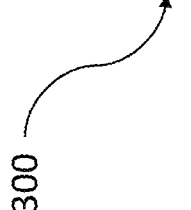

Referring to FIG. 9, a method 300 of removing debris from a drill out system is also provided. The method 300 may include any of the components, systems, and/or devices described herein and any functions, processes, and/or steps performed by said components, systems, and/or devices are within the scope of the method 300.

The method 300 may including a step 302 of lubricating a drill. The drill may be the same as the drill 104 described herein. The lubricant may be the same as the lubricant 110 described herein. The lubricating step may further include supplying the lubricant to a drill bit of the drill through a hollow volume of the drill. The lubricant may be transported from the surface, down through the drill, and out the distal end of the drill so as to lubricate the drill bit of the drill. As the lubricant exits the distal end of the drill, the lubricant will coat the drill bit to provide lubrication.

The method 300 may further include a step 304 of drilling a plug positioned in a well with the drill. The plug may be the same as the plug 103 described herein. The well may be the same as the well 102 described herein. The drilling step 304 may further include drilling through ground rock with the drill. The drilling step 304 may further include drilling a casing positioned in the well with the drill. The casing may be the same as the casing 105 described herein. The drilling of the plug, and the optional drilling of ground rock and/or the casing, produces debris from the broken plug and optional ground rock and/or casing. The debris may be the same as the debris 112 described herein. During the drilling step 304, the debris becomes suspended in the lubricant which produces a slurry of debris suspended in lubricant. The slurry may be the same as the slurry 114 described herein.

The method 300 may further include a step 306 of transporting the slurry from the well to a plug catcher. The plug catcher may be the same as the plug catcher 122 described herein. The plug catcher may include a first plug catcher run having a first end and a second end opposite the first end, a first valve in an open position and positioned on the first end of the first plug catcher run, a second plug catcher run having a first end and a second end opposite the first end, and a second valve in a closed position and positioned on the first end of the second plug catcher run. The first plug catcher run, the first valve, the second plug catcher run, and the second valve may be the same as the first plug catcher run 124, the first valve 134, the second plug catcher run 126, and the second valve 140 described herein.

The method 300 may further include a step 308 of filtering the slurry in the first plug catcher run to produce a recycled lubricant. The recycled lubricant may be the same as the recycled lubricant 128 described herein.

The method 300 may further include a step 310 of activating a controller to cycle the first valve from an open position to a closed position to prevent the slurry from flowing into the first plug catcher run and to cycle a second valve from a closed position to an open position to allow the slurry to flow into the second plug catcher run. The controller may be the same as the controller 142 described herein. The activating step 310 may include providing an input to an input component of the controller to activate the controller. The input component may be the same as the input component 170 described herein. The activating step 310 may include activating the controller to cycle the first valve to the closed position and to cycle the second valve to the open position once a first differential pressure across the first plug catcher run exceeds a first maximum differential pressure, with the first differential pressure based on a first pressure measurement from a first pressure sensor positioned on the first end of the first plug catcher run and a second pressure measurement from a second pressure sensor positioned on the second end of the first plug catcher run. The first maximum differential pressure, the first pressure measurement, the first pressure sensor, the second pressure measurement, and the second pressure sensor may be the same as the first maximum differential pressure, the first pressure measurement P1, the first pressure sensor 144, the second pressure measurement P2, and the second pressure sensor 146 described herein.

The method 300 may further include a step 312 of filtering the slurry in the second plug catcher run to produce the recycled lubricant. The combination of steps 308, 310, and 312 allows for the method 300 to continuously filter slurry to produce recycled lubricant.

The method 300 may further include a step 314 of, after filtering the slurry in the second plug catcher run, reactivating the controller to cycle the first valve from the closed position to the open position and to cycle the second valve from the open position to the closed position. The reactivating step 312 may include reactivating the controller to cycle the first valve to the open position and to cycle the second valve to the closed position once a second differential pressure across the second plug catcher run exceeds a second maximum differential pressure, with the second differential pressure based on a third pressure measurement from a third pressure sensor positioned on the first end of the second plug catcher run and a fourth pressure measurement from a fourth pressure sensor positioned on the second end of the second plug catcher run. The second maximum differential pressure, the third pressure measurement, the third pressure sensor, the fourth pressure measurement, and the fourth pressure sensor may be the same as the second maximum differential pressure, the third pressure measurement P3, the third pressure sensor 148, the fourth pressure measurement P4, and the fourth pressure sensor 150 described herein. The reactivating step 312 may include providing an input to the input component of the controller to reactivate the controller.

The method 300 may further include a step 316 of transporting the recycled lubricant from the plug catcher to a manifold comprising a plurality of output streams and a plurality of manifold valves. The manifold, plurality of output streams, and plurality of manifold valves may be the same as the manifold 152, plurality of output streams 154, and plurality of manifold valves 156 described herein.

The method 300 may further include a step 318 of activating or reactivating the controller to cycle the plurality of manifold valves independently between an open position and a closed position such that the recycled lubricant is selectively supplied to the plurality of outlet streams.

The method 300 may further include a step 320 of transporting the recycled lubricant from the plug catcher to a tank. The tank may be the same as the tank 160 described herein. The transporting step 318 may include transporting the recycled lubricant from the plug catcher to the tank by transporting the recycled lubricant through the manifold and out one of the outlet streams of the plurality of outlet streams that is in fluid communication with the tank.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A debris capturing system, comprising:
   a plug catcher configured to receive a slurry of debris suspended in the lubricant and filter the slurry to produce a recycled lubricant, wherein the plug catcher comprises:
   a first plug catcher run having a first end and a second end opposite the first end;
   a first valve in an open position and positioned on the first end of the first plug catcher run;
   a second plug catcher run having a first end and a second end opposite the first end; and
   a second valve in a closed position and positioned on the first end of the second plug catcher run;
   a flush pump configured to flush and clean the first plug catcher run and second plug catcher run without using wellbore pressure; and
   a controller;
   wherein the controller is configured to cycle the first valve to a closed position to prevent the slurry from flowing into the first plug catcher run, and to cycle the second valve to an open position to allow the slurry to flow into the second plug catcher run when a first differential pressure across the first plug catcher run exceeds a first maximum differential pressure; and
   wherein the first maximum differential pressure is in the range of from 10 psi to 50 psi.

2. The debris capturing system of claim 1, wherein the controller is a hydraulic controller comprising a hydraulic unit and the first valve and second valve are hydraulic valves, wherein the hydraulic unit is in hydraulic communication with the first valve and second valve.

3. The debris capturing system of claim 1, wherein the first valve and the second valve are electric valves that are in electrical communication with the controller.

4. The debris capturing system of claim 1, wherein the debris of the slurry comprises portions of a plug.

5. The debris capturing system of claim 1, wherein the controller comprises an input component, wherein the controller is configured to cycle the first valve to a closed position and to cycle the second valve to an open position when an operator provides an input to the input component.

6. The debris capturing system of claim 1, wherein the plug catcher further comprises:
   a first pressure sensor on the first end of the first plug catcher run; and
   a second pressure sensor on the second end of the first plug catcher run.

7. The debris capturing system of claim 1, wherein the plug catcher continuously filters the slurry to produce the recycled lubricant.

8. The debris capturing system of claim 1, wherein the debris capturing system further comprises a manifold in fluid communication with the plug catcher and configured to receive the recycled lubricant, wherein the manifold comprises a plurality of outlet streams and a plurality of manifold valves positioned on the plurality of outlet streams, wherein the controller is configured to cycle the plurality of manifold valves independently between an open position and a closed position.

9. The debris capturing system of claim 1, wherein the debris capturing system further comprises a tank in fluid communication with the plug catcher and configured to receive the recycled lubricant from the plug catcher.

10. The debris capturing system of claim 1, further comprising a basket in fluid communication with the plug catcher and configured to receive flushed debris for inspection from the plug catcher.

11. A drill out system, comprising:
a drill configured to bore a well, wherein the drill comprises a hollow volume that supplies a lubricant into the well; and
the debris capturing system of claim 1 in fluid communication with the well.

12. A method of removing debris from a drill out system, comprising the steps of:
lubricating a drill with a lubricant;
drilling a plug positioned in a well with the drill, wherein the drilling produces a slurry comprising debris suspended in the lubricant;
transporting the slurry in the well to a plug catcher comprising:
a first plug catcher run having a first end and a second end opposite the first end;
a first valve in an open position and positioned on the first end of the first plug catcher run;
a second plug catcher run having a first end and a second end opposite the first end;
a second valve in a closed position and positioned on the first end of the second plug catcher run; and
a flush pump configured to flush and clean the first plug catcher run and second plug catcher run without using wellbore pressure;
filtering the slurry in the first plug catcher run to produce a recycled lubricant;

activating a controller to cycle the first valve from an open position to a closed position to prevent the slurry from flowing into the first plug catcher run and to cycle a second valve from a closed position to an open position to allow the slurry to flow into the second plug catcher run once a first differential pressure across the first plug catcher run exceeds a first maximum differential pressure, wherein the first maximum differential pressure is in the range of from 10 psi to 50 psi;
filtering the slurry in the second plug catcher run to produce the recycled lubricant; and
flushing debris present in the first plug catcher run after the first valve is closed without using wellbore pressure.

13. The method of claim 12, wherein the activating step comprises providing an input to an input component of the controller to activate the controller.

14. The method of claim 12, wherein the first differential pressure is based on a first pressure measurement from a first pressure sensor positioned on the first end of the first plug catcher run and a second pressure measurement from a second pressure sensor positioned on the second end of the first plug catcher run.

15. The method of claim 12, further comprising, after filtering the slurry in the second plug catcher run, reactivating the controller to cycle the first valve from the closed position to the open position and to cycle the second valve from the open position to the closed position.

16. The method of claim 12, further comprising transporting the recycled lubricant from the plug catcher to a tank.

17. The method of claim 12, further comprising transporting the recycled lubricant from the plug catcher to a manifold comprising a plurality of output streams and a plurality of manifold valves.

18. The method of claim 12, further comprising:
flushing the debris present in the first plug catcher run after the first valve is closed to a basket that is in fluid communication with the plug catcher; and
inspecting the debris in the basket.

* * * * *